(12) United States Patent
Chen et al.

(10) Patent No.: US 8,407,236 B2
(45) Date of Patent: Mar. 26, 2013

(54) MINING NEW WORDS FROM A QUERY LOG FOR INPUT METHOD EDITORS

(75) Inventors: Weizhu Chen, Beijing (CN); Qian Xun Li, Beijing (CN); Li Ju, Beijing (CN); Zheng Chen, Beijing (CN); Dong Li, Beijing (CN); Zhikai Fan, Beijing (CN)

(73) Assignee: Microsoft Corp., Redmond, WA (US)

( * ) Notice: Subject to any disclaimer, the term of this patent is extended or adjusted under 35 U.S.C. 154(b) by 504 days.

(21) Appl. No.: 12/244,774

(22) Filed: Oct. 3, 2008

(65) Prior Publication Data

US 2010/0088303 A1    Apr. 8, 2010

(51) Int. Cl.
*G06F 17/30* (2006.01)

(52) U.S. Cl. ......................... 707/759; 707/760

(58) Field of Classification Search .................. 707/706, 707/741, 754, 759, 765, 769, 760
See application file for complete search history.

(56) References Cited

U.S. PATENT DOCUMENTS

| | | |
|---|---|---|
| 5,970,492 A | 10/1999 | Nielsen |
| 6,282,508 B1 | 8/2001 | Kimura et al. |
| 6,564,213 B1 | 5/2003 | Ortega et al. |
| 6,631,500 B1 | 10/2003 | Kumhyr |
| 2001/0028340 A1* | 10/2001 | Mailman ...................... 345/156 |
| 2003/0158842 A1* | 8/2003 | Levy et al. ...................... 707/3 |
| 2004/0254920 A1* | 12/2004 | Brill et al. ...................... 707/3 |
| 2004/0267670 A1 | 12/2004 | Minyailov |
| 2005/0165739 A1 | 7/2005 | Yamamoto et al. |
| 2005/0197829 A1* | 9/2005 | Okumura ...................... 704/10 |
| 2005/0209844 A1* | 9/2005 | Wu et al. ...................... 704/2 |
| 2007/0294187 A1 | 12/2007 | Scherrer |
| 2008/0312911 A1* | 12/2008 | Zhang ...................... 704/10 |

FOREIGN PATENT DOCUMENTS

| | | |
|---|---|---|
| CN | 1664818 A | 9/2005 |
| CN | 1954315 A | 4/2007 |
| CN | 101055588 A | 10/2007 |
| CN | 101119334 A | 2/2008 |

OTHER PUBLICATIONS

"International Search Report", Mailed Date: Aug. 2, 2010, Application No. PCT/IB2009/008016, Filed Date: Oct. 4, 2009, pp. 9.

(Continued)

*Primary Examiner* — Christyann Pulliam
*Assistant Examiner* — Fariborz Khoshnoodi
(74) *Attorney, Agent, or Firm* — Lyon & Harr, LLP; Katrina A. Lyon

(57) ABSTRACT

Described is a technology in which new words (including a phrase or set of Chinese characters) are mined from a query log. The new words may be added to (or otherwise supplement) an IME dictionary. A set of candidate queries may be selected from the log based upon market (e.g., the Chinese market) and/or by language. From this set, various filtering steps are performed to locate only new words that are frequently in used. For example, only frequent queries are kept for further processing, which may include filtering out queries based on length (e.g., less than two or greater than eight Chinese characters), and/or filtering out queries based on too many stop-words in the query. Processing may also include filtering out a query that is a substring of a larger query, or vice-versa. Also described is Pinyin-based clustering and filtering, and filtering out queries already handled in the dictionary.

18 Claims, 3 Drawing Sheets

OTHER PUBLICATIONS

"Microsoft Global Input Method Editors (IMEs)", http://www.microsoft.com/windows/ie/ie6/downloads/recommended/ime/default.mspx.

"Google China (GuGe) boosting the Chinese IME with Google Pinyin", http://www.filination.com/blog/2007/04/06/google-china-guge-boosting-the-chinese-ime-with-google-pinyin/.

"Add a word to an Input Method Editor (IME) dictionary", http://office.microsoft.com/en-us/word/HP030744021033.aspx.

Kraft, et al., "Mining Anchor Text for Query Refinement", WWW2004, May 17-22, 2004, New York, New York, USA, 2004, pp. 666-674.

* cited by examiner

MINING NEW WORDS FROM A QUERY LOG FOR INPUT METHOD EDITORS

BACKGROUND

An Input Method Editor (IME) is a tool provided in many computers that helps users input data into the computer system. However, the various words and language model inside the IME is fixed and cannot be used to assist users in inputting new words (including terms such as names), which appear very often.

While it is straightforward to adapt an IME to use new words, automatically finding such new and effective words regularly (e.g., daily) is a difficult problem. Such a task needs to find relevant new words, yet at the same time be automated.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which new words (including a phrase or set of Chinese characters) are mined from a query log. The new words may be added to (or otherwise supplement) an IME dictionary.

In one aspect, the query log may be separated by market (e.g., the Chinese market) and/or by language. From this set of queries, only frequent queries are kept for further processing. Further processing may include filtering out queries based on length (e.g., less than two or greater than eight Chinese characters), and/or filtering out queries based on too many stop-words in the query. Processing may also include filtering out a query that is a substring of a larger query, e.g., unless the substring better represents the meaning of the query, (e.g., as judged by the process). Also described is Pinyin-based clustering and filtering, and filtering out queries already handled in the dictionary.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a mechanism/method to obtain new phrases (or words) from a query log data source for use in an input method editor (IME). While some of the examples described herein are directed towards Chinese phrases/symbols (words and characters), it is understood that these are only useful examples. The mining techniques described herein may be used with other languages, and for other purposes. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data mining in general.

Figure 1:
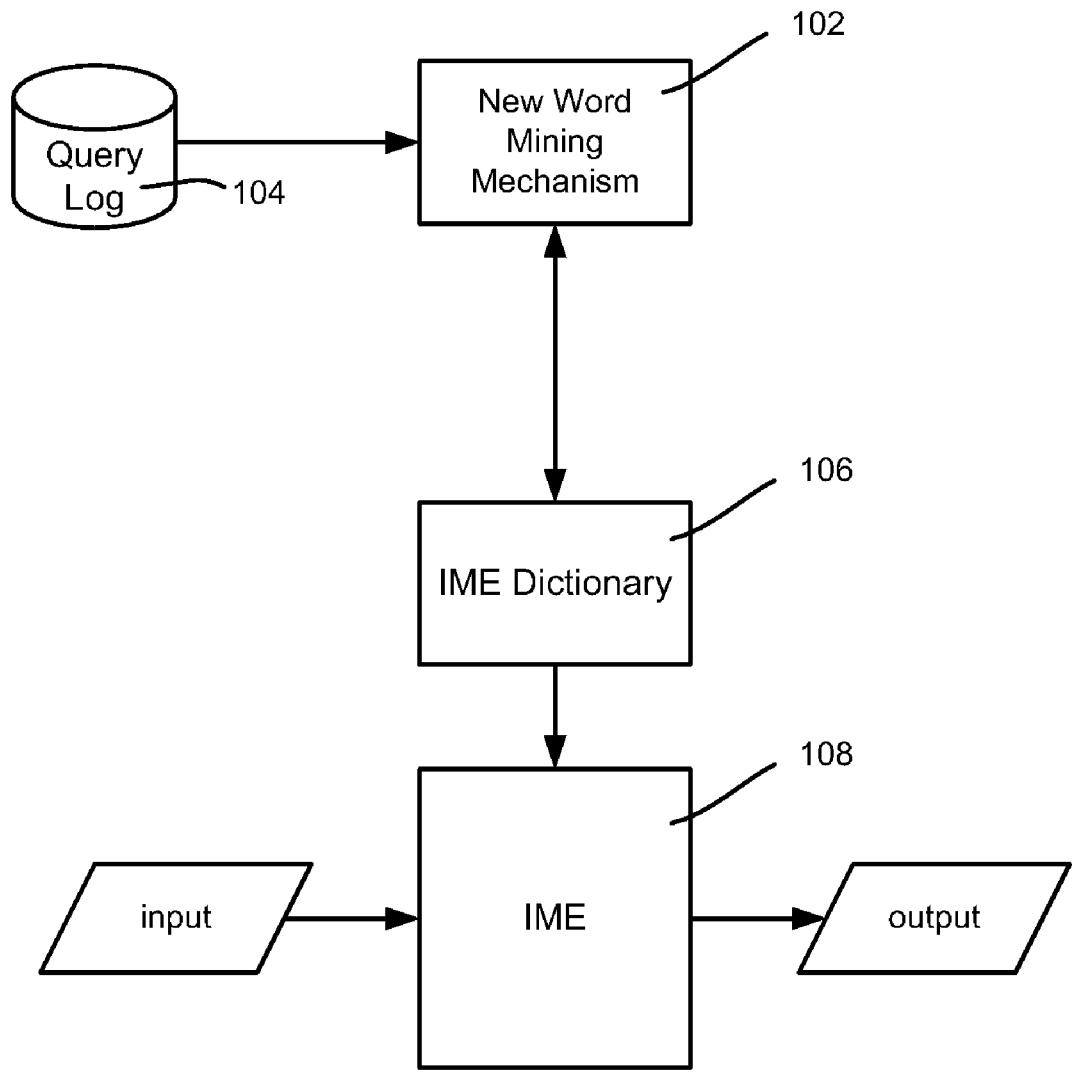
FIG. 1 is a block diagram showing example components for mining new words from a query log for use by an Input Method Editor (IME).

Turning to FIG. 1, there is shown a new word mining mechanism 102 that obtains new words (including phrases containing two or more Chinese characters) from a query log data source 104. In one implementation, selected new words are placed into the IME dictionary 106 for use by the IME 108. Note that it is feasible to have a fixed IME dictionary with new words added to a supplemental dictionary, however it is understood that FIG. 1 is only one possible implementation. As described below, the new word mining mechanism 102 employs various filtering algorithms to remove any "noise" that appears in queries, as well as to not add words or the like already properly handled by the dictionary 106.

Figure 2:
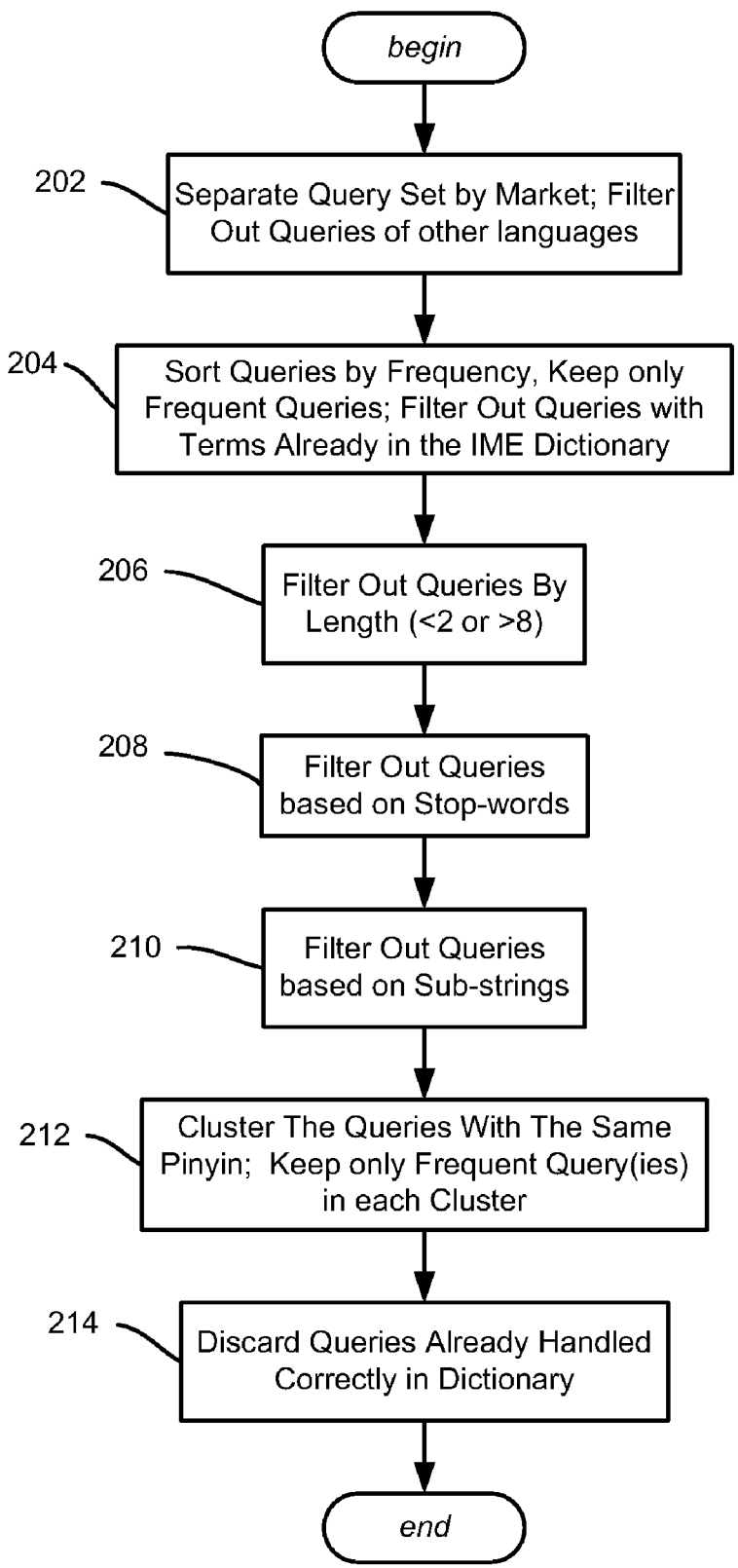
FIG. 2 is a flow diagram representing example steps for determining which phrases to mine from the query log.

In general, one example implementation automatically generates new words for a Chinese IME via seven general steps represented in FIG. 2. One suitable data source 104 is query log data generated from live searching, such as the Windows® Live Search Log. The scale of the Live Search log is on the order of hundreds of millions of transactions each day. One implementation uses twelve months of the query log, and updates the new words daily, with ten months of aggregated data used as training data to generate the new words and the other two months aggregated data as an evaluation dataset to test the performance.

For the Chinese IME implementation, taking the raw query log as input, at step 202 (FIG. 2) the query set is separated by the various markets, (e.g., queries submitted in the Chinese search market), with only the relevant market kept. A charset-based algorithm is used to filter non-Chinese queries, keeping only the Chinese queries. These queries are processed by the remaining exemplified steps of FIG. 2 that extract the new words based upon training sets.

In a next step 204, queries are sorted by frequency so as to only consider sufficiently frequent queries, that is, those having a frequency higher than a threshold. The total phrase set in the current IME dictionary is also obtained; the exemplified algorithm filters out any query that is already in the current IME dictionary.

Step 206 is directed to filtering and separating the queries by length. More particularly, in a Chinese query implementation, the queries are classified by length to filter out queries whose length is greater than eight Chinese characters or less than two Chinese characters. Note that the upper limit of eight is used because one current Chinese IME does not support phrases longer than eight; (however this length may be modified as appropriate based upon the IME in use). The lower limit is used because queries that have only one Chinese character are, in general, ambiguous. This step is also a pre-step for step 210.

In step 208, stop-word filtering is performed to account for the fact that there are often one or more various stop-words in a query set (e.g., articles such as "the" in English, pronouns and prepositions, like "的, 什么, 吗, 我, 你, 他" in Chinese, and so on). A stop word list is built for such words or characters. The percentage of stop-words may be calculated by:

$$S(\text{query}) = \frac{\#(\text{of stopword character})}{\#(\text{of total character}) * \log(\#\text{ of total character})}$$

A threshold percentage, which may be determined by tuning, may be used to filter out any query that is less than this threshold.

Step 210 refers to substring filtering, which deals with removing a short query that is a substring of another, longer query. In Chinese, examples include 百度歌 and 百度歌曲, 音乐排行 and 音乐排行榜. Sometimes a short query results from a user being unwilling to enter whole words into a query; other times this results from a typographical error, or some different expression of user intension.

As can be readily appreciated, adding both strings and substrings of those larger strings into the set of new words may result in duplicate entries in the IME dictionary. As described herein, a substring-based filtering algorithm detects such duplicates.

One such algorithm operates by extracting the query pair (q1, q2), where q1 is a substring of q2 and the length of q2 is equal to the length of q1 plus 1. Then a scale ratio is defined as:

$$R1 = \frac{freq(q1)}{freq(q2)}$$

Two thresholds $\alpha$ and $\beta$ are used, which may be used via tuning. For $R1<\alpha$, the algorithm filters q1 because q1 is expected to be a substring of q2 and most users are interested in q2. For $R1>\beta$, the algorithm regards q1 as being a much popular query than q2, whereby it is expected to cover the main meaning of q2.

As represented by step 212, further filtering is performed based upon the same pinyin (in which the pinyin results from known mechanisms for converting Chinese symbols into the Roman alphabet). More particularly, there are some queries with the same pinyin in the log; examples of which include 百度 and 摆渡. The Chinese IME attempts to extract new words for the same pinyin. To this end, one exemplified algorithm uses a query-to-pinyin model to first translate a query to pinyin, and cluster the queries with the Same pinyin together. In each cluster, the algorithm sorts the query by frequency, and keeps those with a sufficiently high frequency. In one current implementation, only up to the top two queries in each cluster are kept; in the event that the second largest frequency is relatively small, only the top one query in this cluster is kept.

Step 214 is performed to detect an already-correct case. More particularly, some queries may be translated correctly in the current IME engine by typing its pinyin. In step 214, one algorithm implementation uses a word-to-pinyin model to first translate the query to pinyin, and then translate the pinyin to a word using a pinyin-to-word model. If the query is the same (e.g., exactly the same) as the translated word, this query is not considered for new word analysis because the current IME engine already handles it correctly.

In this manner, new words (which in Chinese correspond to two or more characters) are mined from queries submitted by users. Via various filtering, only new words that are frequently queried are mined, thereby automatically updating an IME dictionary with relevant words that are not already in the dictionary.

EXEMPLARY OPERATING ENVIRONMENT

Figure 3:
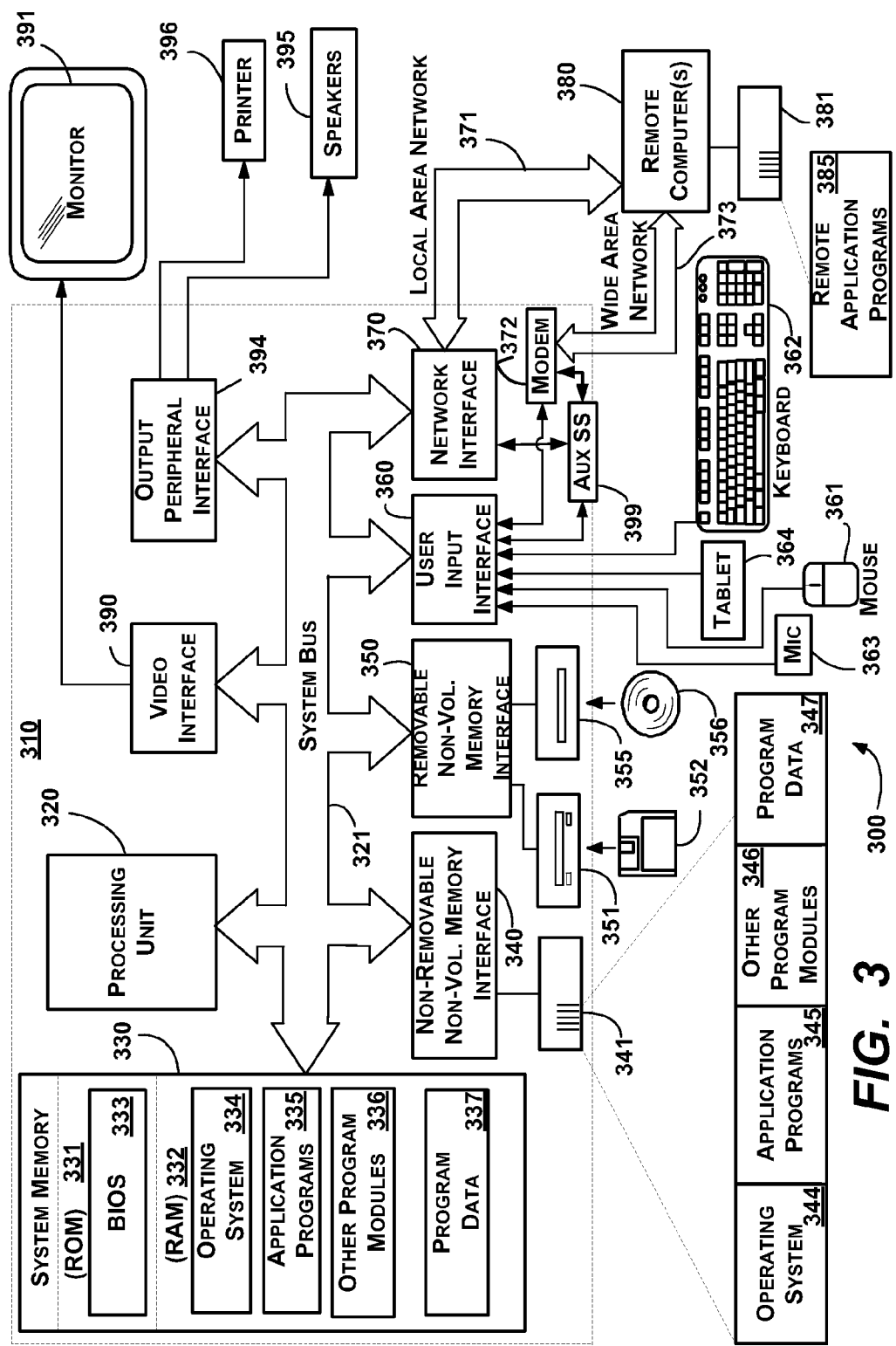
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, processing a log of queries to obtain new words for a dictionary, including:
   selecting a set of queries based upon language from the log of queries;
   filtering out queries that are infrequent in the selected set of queries obtained from the log;
   translating queries in the log of queries to pinyins using a query-to-pinyin model;
   clustering queries corresponding to a common pinyin;
   in each cluster of queries with a common pinyin, sorting the queries by frequency;
   filtering out queries that have a low frequency in each cluster;
   eliminating any remaining query corresponding to words that are not new to the dictionary; and
   adding words that are new to the dictionary to the dictionary.

2. The method of claim 1 further comprising, selecting the set of queries by separating the log into the set of queries based upon both a market and a language.

3. The method of claim 1 further comprising, filtering out queries based upon a length of each query.

4. The method of claim 3 wherein the queries comprise Chinese characters, and wherein filtering out queries based upon the length comprises filtering out queries corresponding to less than two Chinese characters.

5. The method of claim 3 wherein the queries comprise Chinese characters, and wherein filtering out queries based upon the length comprises filtering out queries corresponding to more than eight Chinese characters.

6. The method of claim 1 further comprising, filtering out at least one query that is a substring of a larger query.

7. The method of claim 1 further comprising, filtering out at least one query comprising a string, when a substring of that string represents the string.

8. The method of claim 1 further comprising, filtering out at least one query based on a computation of stop-words in that query.

9. The method of claim 1 further comprising a dictionary of words, and further comprising, filtering out queries already handled in the dictionary.

10. In a computing environment having a query log, a system comprising,
   a general purpose computing device;
   a computer program comprising program modules executable by the general purpose computing device, comprising:
   an input method editor module, and
   a new word mining mechanism module that provides new words to a dictionary of the input method editor, by:
   processing queries selected from the query log based on language,
   translating queries in the query log to pinyins using a query-to-pinyin model;
   clustering queries corresponding to a common pinyin;
   in each cluster of queries with the common pinyin, sorting the queries by frequency;
   filtering out infrequent queries in each cluster; and
   discarding words corresponding to the remaining queries that are already handled by the input method editor via the dictionary; and
   adding words that are new to the dictionary to the dictionary.

11. The system of claim 10 wherein the queries correspond to Chinese characters, and wherein the new word mining mechanism filters out queries of less than two Chinese characters, and queries of more Chinese characters than a limit of the input method editor.

12. The system of claim 10 wherein the new word mining mechanism evaluates words that are substrings of a larger string to determine whether to include the substring in the dictionary as a new word instead of the string, or include the string in the dictionary instead of the substring.

13. The system of claim 10 wherein the new word mining mechanism filters out at least one query based on stop-words in that query.

14. The system of claim 10 wherein queries processed from the query log are selected from the log based upon a market, or based upon a language, or based upon both a market and a language.

15. One or more computer memories having computer-executable instructions stored thereon, which when executed perform steps, comprising,
   processing a set Chinese language queries to obtain new words that are not in a dictionary of an input method editor, further comprising:
   filtering out queries that are infrequent in a set of queries obtained from a query log,
   translating queries in the set of queries to pinyins using a query-to-pinyin model,
   clustering queries with the same corresponding to a common with the same pinyin,
   in each cluster of queries with the same pinyin, sorting the queries by frequency,
   filtering out infrequent queries in each cluster; and
   filtering out queries that are less than two Chinese characters.

16. The one or more computer memories of claim 15 having further computer-executable instructions, comprising, filtering out at least one query that is a substring of a larger query that is not a new word in the dictionary of the input method editor.

17. The one or more computer memories of claim 16 having further computer-executable instructions, comprising, filtering out at least one query based on a computation of stop-words in that query.

18. The one or more computer memories of claim 16 having further computer-executable instructions, comprising, filtering out queries having a low frequency in a cluster when clustered based upon pinyin clustering.

* * * * *